Feb. 8, 1944.  W. J. S. JOHNSON  2,341,383
PRECISION BORING MACHINE
Filed Oct. 26, 1940  4 Sheets-Sheet 1

INVENTOR.
WALLACE J. S. JOHNSON
BY
Oscar A. Mellin

Feb. 8, 1944.  W. J. S. JOHNSON  2,341,383
PRECISION BORING MACHINE
Filed Oct. 26, 1940   4 Sheets-Sheet 2
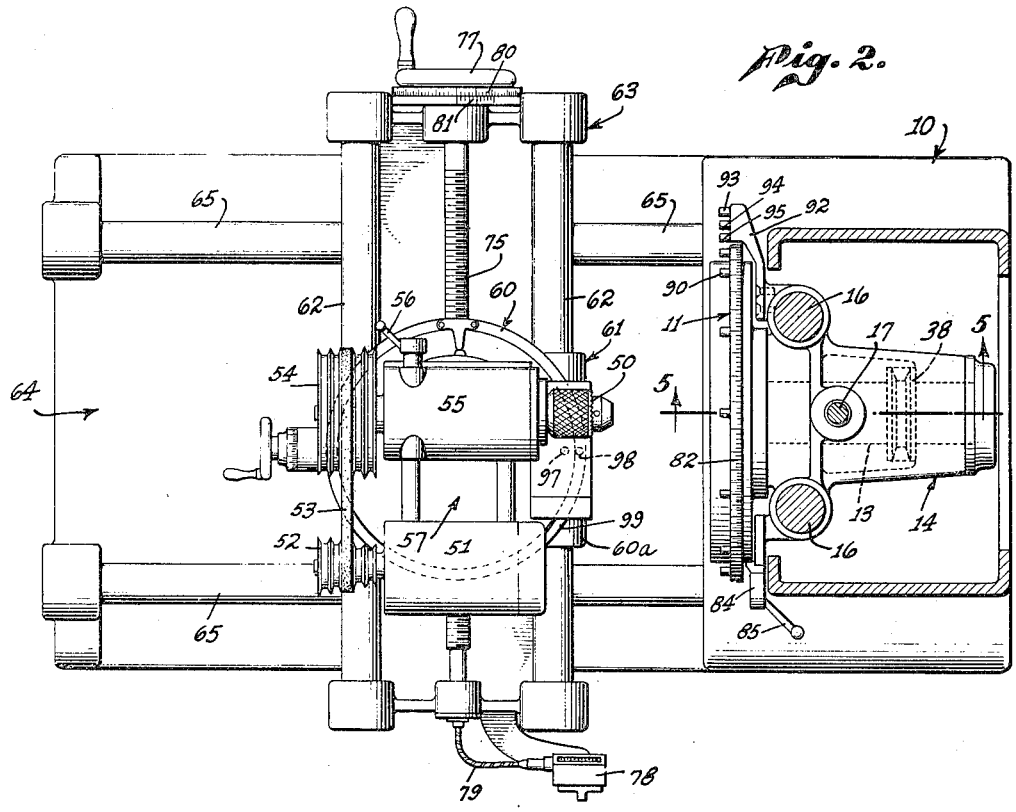
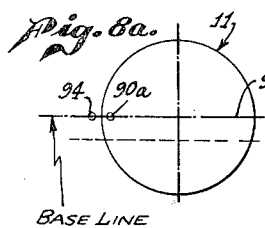 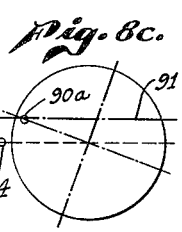 
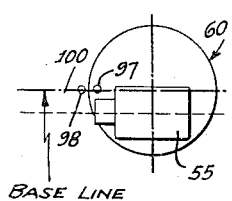 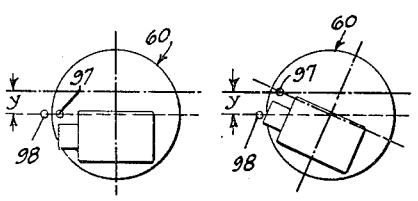 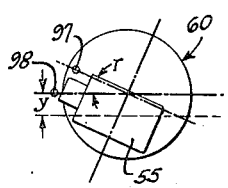
INVENTOR.
WALLACE J. S. JOHNSON
BY
Oscar A. Mellin

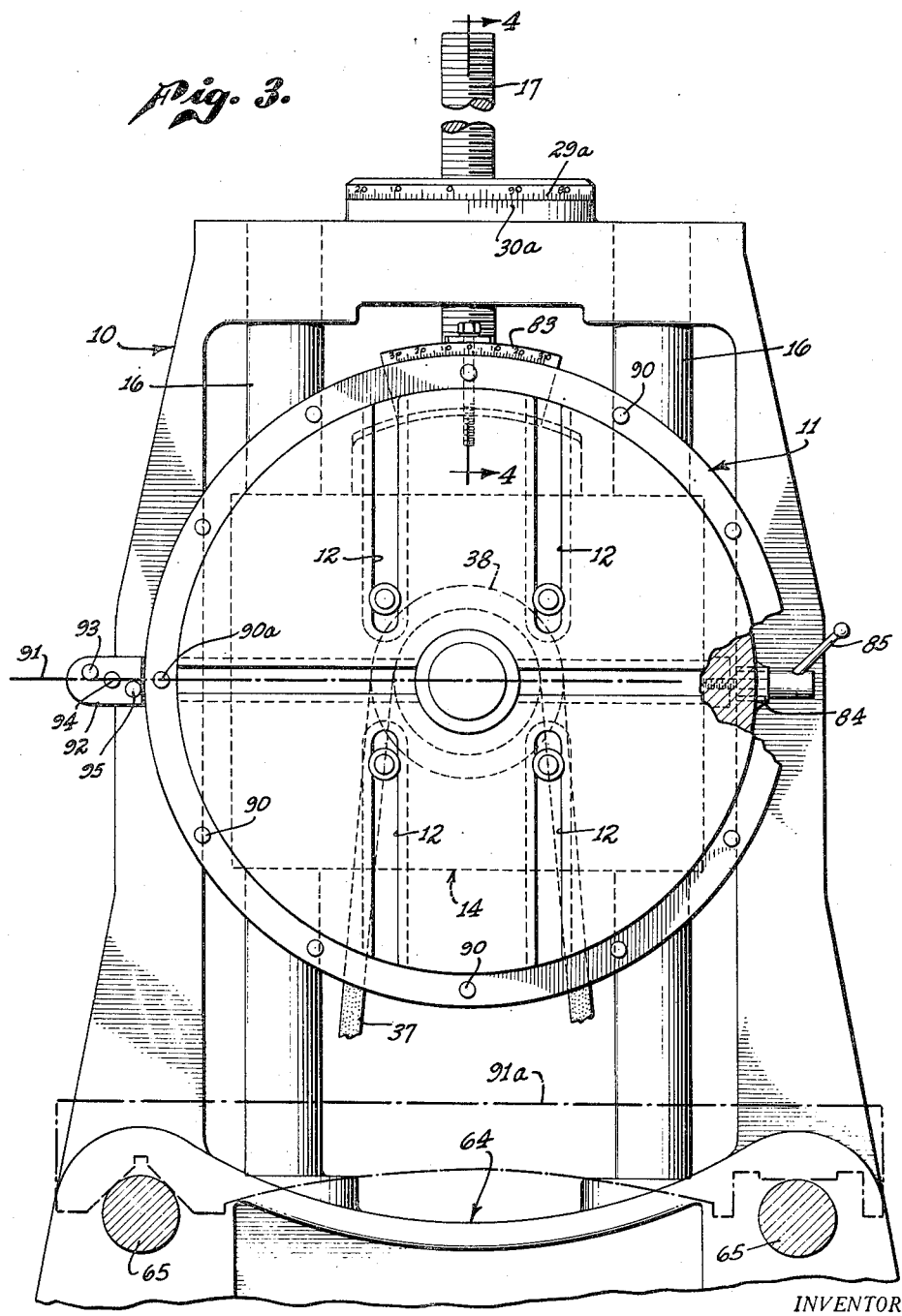

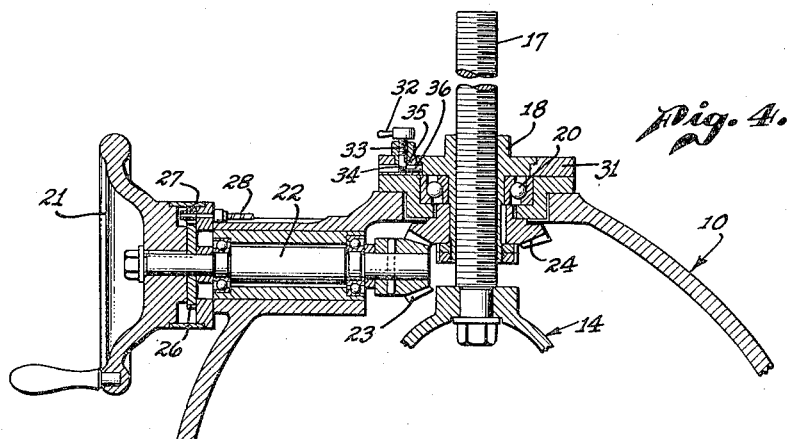
Fig. 4.
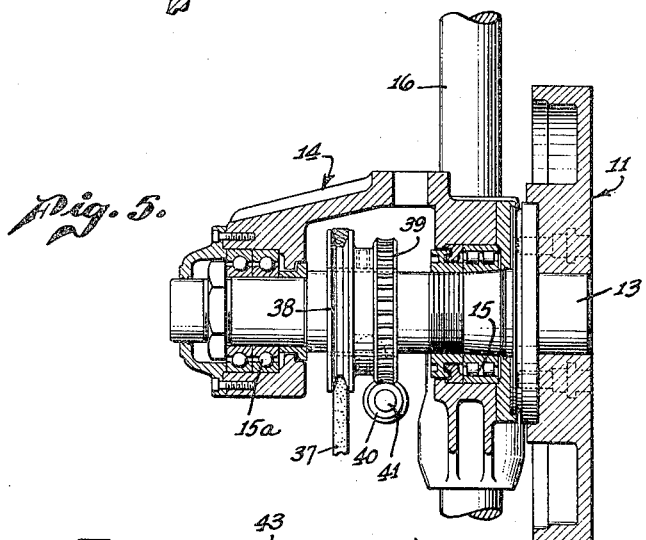
Fig. 5.
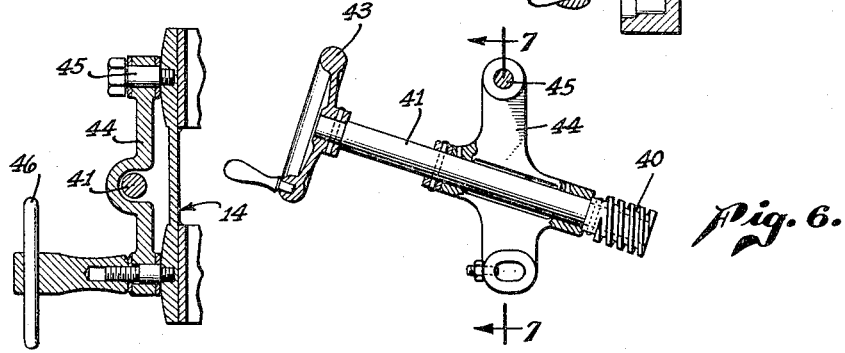
Fig. 6.
Fig. 7.
Inventor
WALLACE J. S. JOHNSON
By Oscar A. Mellin
Attorney Patented Feb. 8, 1944

2,341,383

UNITED STATES PATENT OFFICE 2,341,383

PRECISION BORING MACHINE

Wallace J. S. Johnson, Berkeley, Calif., assignor, by mesne assignments, to Kearney & Trecker Products Corporation, Milwaukee, Wis., a corporation Application October 26, 1940, Serial No. 362,920

4 Claims. (Cl. 77—64)

The present invention relates to machine tools, and particularly to machines of precision character capable of performing locating, boring, checking, drilling, reaming, milling, and analogous operations with extreme accuracy in work mounted in the machine.

Heretofore, rotary tables have been specially provided in jig boring and similar production machines for the purpose of spacing holes accurately in a circle around the work. After the boring spindle was disposed the desired radius from the center of the work, the holes were located or drilled in a circle by indexing or turning the rotary table the required angular amounts in degrees and minutes, starting from a suitable base-line. The method previously used for determining such angular table movements utilizes spaced graduations, sometimes with a supplemental vernier, but the limitations of accuracy thus visually determined are such that the method is, in many cases, not productive of satisfactory accuracy.

Accordingly, it is an object of this invention to index or adjust a rotary table or swivel tool support the desired angular extent in a more accurate and rapid manner, and without limitations by the diameter of the table or support, or the fineness of the graduations on its periphery. In furtherance of this objective, the table or tool support is arranged so that a fixed reference point thereon is aligned with a definite base-line, or occupies some other known position with respect thereto. The tool or support is moved rectilinearly with respect to this base-line by a linear distance determined by the desired angular or arcuate adjustment. The shifted object is then rotated until its reference point again occupies its original position with respect to the base-line, after which, in some cases, it is translated linearly back to the base-line the distance that it was originally displaced. By this means, the table or support is precisely rotated the desired angle, without dependence upon arcuate graduations on its periphery, and independently of its diameter. The necessary angular displacement is accurately determined and controlled by indicating devices registering during the rectilinear feeding of the table or support, and these devices may be so related to the feeding movement as to indicate the adjustment accurately in very small increments.

Another object of the invention is to provide an improved machine tool capable of precision adjustments in angularly spacing holes in the work, and also in drilling holes angularly in the work, as well as boring tapered holes therein.

A further object of the invention is to provide a machine capable of precise rectilinear adjustment, as opposed to polar adjustment, for the purpose of performing various operations with extreme accuracy in work secured to the machine.

One form which the invention may assume is exemplified in the following description and illustrated by way of example in the accompanying drawings, in which:

Fig. 2 is a top plan view of the machine, parts being shown in section;

Fig. 3 is an elevation on an enlarged scale, as seen from the front of the rotary table of the machine;

Fig. 4 is a section taken generally along the line 4—4 in Fig. 3;

Fig. 5 is a section taken generally along the line 5—5 in Fig. 2;

Fig. 6 is a partial sectional and elevational view of part of the mechanism for indexing the rotary table;

Fig. 7 is a section taken generally along the line 7—7 in Fig. 6;

Figure 1:
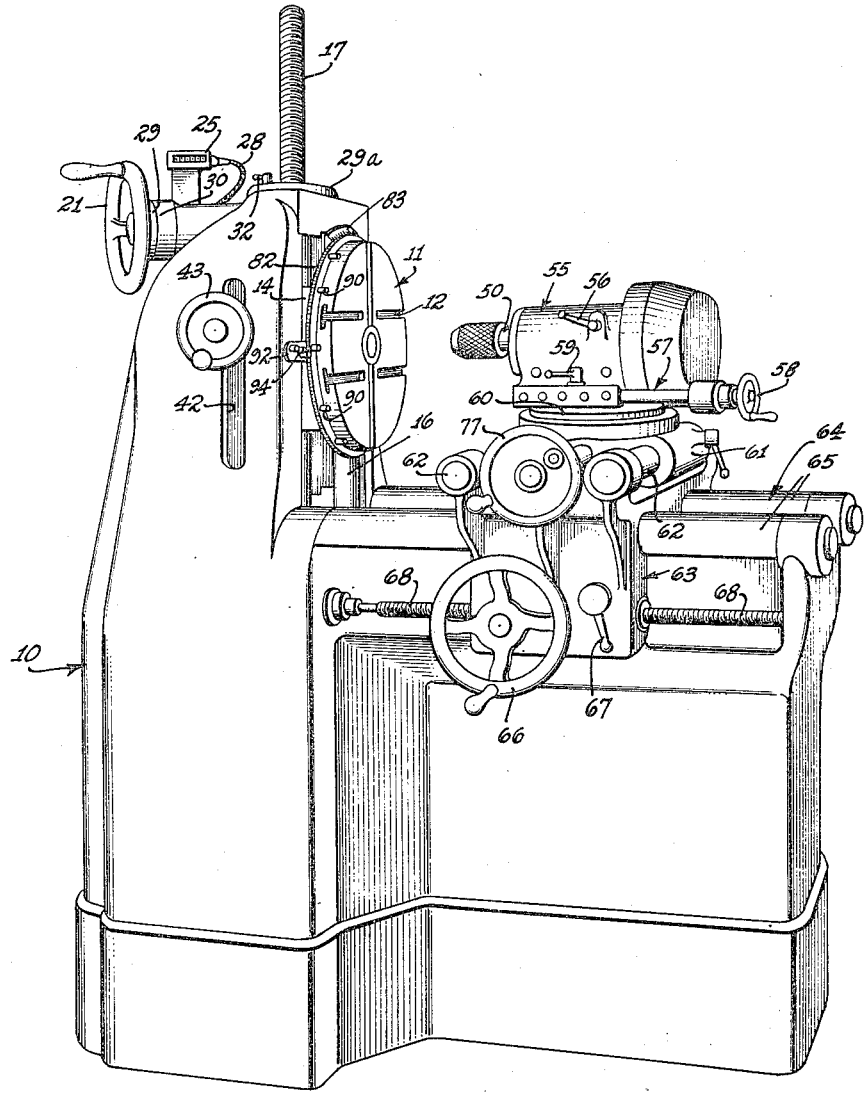
Fig. 1 is a perspective view of a machine embodying the present invention.

Figs. 8a to 8d, inclusive, are diagrammatic representations of the manner of angularly adjusting the work table;

Figs. 9a to 9d, inclusive, are diagrammatic representations of the manner of angularly adjusting the tool spindle.

As shown in the drawings, the machine tool includes a main body or support 10 having an indexing rotary table 11 provided with T slots 12 adapted to receive suitable clamps (not shown) for the purpose of fastening work in spaced parallel relation to the face of the table, in a well known manner. This table 11 is secured to a spindle 13 rotatably mounted in a head support or housing 14 by means of anti-friction bearings 15, 15a. This head 14 and the elements carried thereby are mounted for vertical sliding movement on the spaced vertical way shafts 16, 16 fixed to the body 10 of the machine, such vertical movement being obtained by a vertical measuring screw 17 mounted in the head 14 between the ways 16, 16, with its threads received within a feed-nut device 18 rotatably mounted in the body of the machine by the anti-friction bearing 20. Inasmuch as this nut device 18 is prevented from moving axially, its rotation in either direction will produce corresponding vertical movement of the measuring screw 17 and vertical translation of the head 14 and rotary table 11 carried thereby.

Rotation of the nut 18 in either direction is initiated by a hand wheel 21 fixed to a driving shaft 22 rotatably mounted in the body 10 of the machine, and having a bevel pinion 23 at its inner end meshing with a bevel gear 24 secured to the nut 18. The extent of rotation of the hand wheel 21 and the corresponding feeding movement of the measuring screw 17 upwardly or downwardly may be indicated by suitable devices. In the present instance, a mechanical counter 25 is operated from the hand wheel by securing a gear 26 to the hand wheel shaft 22, which meshes with a second gear 27 coupled to a flexible shaft 28 connected to the counter 25. These mechanical counters can be caused to read in suitable units. For example, they may read to hundredths of an inch of vertical movement of the measuring screw 17. For a still more accurate indication of the extent of feeding of this screw 17, a micrometer dial 29 or 29a graduated to read in thousandths of an inch may be secured to the hand wheel 21 or the nut 18, while the indications on this particular dial may cooperate with a micrometer dial vernier 30 or 30a fixed to the housing, and readable to a ten-thousandth of an inch.

Due to the arrangement of indicators described above, accurate adjustments can be made of the measuring screw 17 and the rotary table 11 carried by the head support 14. After the desired feeding or measuring movement of the vertical screw has been made, it can be held in this position by preventing rotation of the nut 18 by means of a clamp ring 31 movable to clamping position against the periphery of the feed nut 18 by rotating a clamp lever 32 and its attached screw 33 threaded into the ring. Downward movement of this screw 33 will force its inclined face 34 against the companion face 35 on the angularly disposed clamp pin 36 urging the latter into contact with the nut 18 and reactively drawing the clamp ring 31 frictionally against the nut rim. Whenever an adjustment is to be made, the clamping device is released from the nut 18, permitting its rotation.

The indexing table 11 is rotatable from a suitable source of power (not shown) by transmitting the driving effort through a belt 37 engageable with a pulley 38 fixed to the table spindle 13. Also secured to this spindle is a worm 39 engageable by a worm 40 fastened to a shaft 41 extending through a slot 42 in the machine body to its exterior, where a hand wheel 43 is secured to the shaft 41 for the purpose of rotating it, and through the worm 40 and worm wheel 39 correspondingly rotating or angularly adjusting to the indexing table 11. The worm 40 is engageable with and disengageable from the worm wheel 39 by rotatably mounting its shaft 41 in a housing 44 pivoted on a fulcrum pin 45 secured to the rotary table housing or head 14. Movement of this housing 44 about its fulcrum 45 is obtainable through the agency of a handle 46 secured to the lower end of the housing 44 and cooperable with the table head 14. Whenever the rotary table 11 is to be power driven, the worm 40 is demeshed from the worm wheel 39, but at other times it may remain in engagement therewith.

The work secured to the rotary table 11 can be acted upon by a suitable tool inserted in a chuck carried by a spindle 50. This spindle is driven by an electric motor 51, whose motion is transmitted from the driving sheaves 52 fixed to the motor shaft, through the V-belt 53 to the driven sheaves 54 coupled to the spindle. The sheaves 52, 54 are stepped to allow the ratio of transmission between the motor 51 and the spindle 50 to be varied.

Rotation of the spindle 50 can be prevented by locking it to the spindle housing 55 by suitably manipulating the spindle clamp lever 56. The spindle housing is movable to and from the work by being mounted on a compound slide 57 including a hand feed 58 which can cause movement of the spindle 50, its housing 55, and associated driving mechanism 51, 52, 54, to and from the work upon rotation of the hand wheel 58. Sliding movement of the spindle housing 55 in this manner may be prevented by means of the compound slide clamp lever 59.

The lower portion of the compound slide 57 is secured to a compound swivel 60 angularly adjustable on a cross-carriage 61 slidable along the spaced cross ways shafts 62, 62 secured to the main carriage 63 of the machine. This latter carriage 63 is shiftable to and from the rotary table 11 by being slidably mounted on the saddle 64 and the longitudinal ways 65, 65 secured to the machine body 10. Advancement of this main carriage 63 along its ways may be obtained in the usual manner by rotating the apron hand feed 66, or it may be power operated by suitably manipulating the power feed lever 67 to couple the power carriage feed screw 68 to the carriage 63, in a known manner.

The cross-carriage 61 is shiftable transversely along the cross-carriage ways 62, 62 by means of the cross measuring screw 75, whose end portions are rotatably mounted in the ends of the main carriage 63 and whose threaded portion cooperates with a mating nut secured to the cross-carriage 61. It is apparent that rotation of the cross measuring screw 75 by means of a hand wheel 77 secured thereto will shift the entire cross-carriage 61 and the compound 57, 60, spindle 50, and motor drive 51, 54 transversely of the machine, or across the face of the rotary table 11. The extent of such movement is indicated by a mechanical counter 78 coupled to the cross measuring screw 75 by the flexible drive shaft 79. By way of example, this counter 78 can indicate to hundredths of an inch of transverse feeding of the cross-carriage 61, while more accurate indications are obtainable by securing a micrometer dial 80 to the hand feed wheel 77 reading in thousandths of an inch. This dial 80 is cooperable with a stationary vernier dial 81 which can readily be read to a ten-thousandths of an inch.

The accuracy with which the table 11 is adjustable vertically and the precise character of the transverse adjustment of the cross-carriage 61 permits the spindle 50 and table 11 to be moved with respect to one another so as to locate a tool at any point on the work fastened to the table. With the spindle swivel 60 arranged so that the spindle axis is at right angles to the face of the table, it is possible to locate or drill holes in the work solely by rectilinearly feeding the table 11 or cross-carriage 61, or both, to the desired extent. Respective horizontal and vertical base-lines should be established on the work and vertical feeding movement of the table 11 made from the horizontal line, or from a horizontal surface plate 91a removably mounted on the ways 65, while horizontal feeding movement of the cross-carriage 61 and spindle 50 is made from the vertical base-line. Knowing the distances of the various holes from these base-lines, the table feed screw 17 and the cross-carriage 61 may be shifted to the desired extent to position the cutting tool secured to the spindle very accurately at the exact point where the hole is to be drilled or otherwise formed in the work.

It is preferable that jig boring drawings come from the drafting room with all dimensions given in relation to base-lines intersecting at a convenient point of the work, in order to eliminate any figuring or computing by the machine operator and facilitating rapid production of the work. The operator need only position his cross-carriage 61 and his table 11 at the base-lines and set his indicators to zero, and then make the necessary vertical and horizontal adjustments in the table and cross-carriage positions, respectively, to the extent indicated by the drawings. In this manner, holes may be drilled at any point in the work, and they may even be disposed in a circular path around the work to a greater degree of accuracy than if the table were rotated to the desired angular extent, as when the usual polar methods of measurement are employed.

It is not only possible to translate the indexing table 11 vertically to various positions by the vertical measuring screw 17 and its associated mechanisms, but it can be angularly adjusted to different arcuate extents through the worm 40 and worm wheel 39. Polar angular measurement is readily obtainable in a rapid manner by means of the degree graduations 82 on the periphery of the table, which are cooperable with the vernier 83, preferably reading in minutes or other fractions of a degree. The table 11 can be held rotatably in any adjusted position by means of the table clamp 84 operable through the clamp lever 85.

Due to the rectilinear and rotary movement of the table 11, and the transverse feeding of the cross-carriage 61 and the spindle 50 mounted thereon, holes may be drilled, located, or otherwise operated upon at any position of the work fastened to the table. The ability to rotate the compound 57, 60 on the carriage swivel 60a also permits angle boring or drilling in the work. The swivel head 60 may also be suitably graduated in degrees or fractions thereof, and cooperable with a vernier, to obtain a rapid adjustment of the swivel to the desired angular extent.

While the angular shifting of the rotary table 11 and compound swivel 60 may possibly be accomplished within an accuracy of one minute of arc, much greater angular accuracy may be obtainable by using the structure now to be described. A plurality of pins 90 is spaced equal distances around the rim of the rotary table, which pins can be in any number and adjustable circumferentially about the table if desired, as for example by adjusting the pins in an angular T slot, not shown. An indexing bracket 92 is fastened to the rotary head or housing support 14, extending around the periphery of the table adjacent one side thereof, where it carries a plurality of pins 93, 94, 95. One of the pins 90a on the rotary table is initially aligned with an imaginary horizontal base-line or reference plane 91, and the intermediate bracket pin 94 occupies the same relation to this base-line, as does the table axis, when the reading on scale 83 is zero and pin 90a is aligned with pin 94. This can be determined by measurement from the surface plate 91a with a suitable dial indicator or other surface gauge in the manner explained in the Meyer Patent No. 2,178,264 later mentioned, or with a suitable indicator held in the boring spindle or in any other position on the spindle head, and causing movement of this indicator over the pins by translating the cross-carriage 61 along its ways 62.

Let it be assumed that it is desired to rotate the work on the rotary table by a specified arcuate distance. The table pin 90a and the intermediate pin 94 on the bracket are first aligned with the imaginary horizontal base-line 91 (see Fig. 8a) as determined by a dial indicator. The table head or housing 14 is then moved linearly by means of the vertical hand feed wheel 21, gearing 23, 24 and the vertical measuring screw 17 to shift the table 11 and indexing bracket 92 by a vertical distance $x$ which is equivalent to the sine of the desired angle $q$ (see Fig. 8b). This linear distance $x$ will be the radius that the table pin 90a is removed from the center of the table times the sine of the desired angle $q$. Following the linear shifting of the table 11 and bracket 92, the table is rotated by means of the hand wheel 43 and associated worm 40 and worm wheel 39 in a proper direction until the table pin 90a is again in exact alignment with the base-line 91 (see Fig. 8c), as determined by the dial indicator. The table is then clamped in this position and the feed screw hand wheel 21 is reversely rotated to translate the intermediate pin 94 on the indexing bracket 92 back to its initial position in alignment with the base-line 91 (see Fig. 8d). As a result of this movement, the center of the rotary table occupies its original axial position, but the table 11 itself has been rotated by the desired angle $q$.

It will be noted that the desired angular movement of the table has been effected as soon as it is rotated to bring the pin 90a back to its original rectilinear path position, as determined by the dial indicator, or other suitable means. For certain types of work this is sufficient, but if the work requires a number of angularly spaced holes to be drilled or bored by the use of spindle 50 it is necessary, following the angular adjustment, to bring the rotary table back to its previous rectilinear path position. Thus, for example, a first or starting hole having been finished with the table axis at the same vertical spacing as the axis of spindle 50 the first operation for the locating of a second angularly spaced hole will be to position one of the pins 90 in predetermined position relative to the imaginary base or reference line as in Fig. 8a. Where both reference pins are cylindrical and of the same diameter, as shown, this can be done by adjusting the pin 90 at the same vertical level as the pin 94. Next the support and rotary table are rectilinearly shifted, as described and as indicated in Fig. 8b. The table is then rotated as described and as indicated in Fig. 8c to effect the angular spacing of the first and second hole and, finally, the rotary table is reversely rectilinearly shifted, as described and as indicated in Fig. 8d, to bring the second hole to the same vertical height as the spindle 50 for the finishing of the hole, the cross adjustment of the spindle 50 being utilized to correctly locate the spindle in cases where the radial location of the second hole differs from that of the first hole. Such operations may proceed in like manner for any number of spaced holes whereby to correctly position each of the holes.

As was aforementioned, the indicating mechanical counter 25, micrometer dial 29 or 29a and vernier dial 30 or 30a permit accurate rectilinear adjustments of the table 11 to be made within at least a ten-thousandths of an inch. Such accurate adjustments are reflected in the above described sine method of angularly shifting the rotary table through the use of linear movements. Instead of being able to adjust the rotary table to an accuracy of only one minute, as when the graduations on its periphery are used, much greater accuracies can be obtained within about plus or minus 1 second of arc. This is all done in a rapid manner, with all of the necessary movable parts readily accessible to the operator.

In a similar manner, the spindle 50 may be swiveled with great accuracy to angularly position it with respect to the face of the rotary table 11 and the work clamped thereto. A pin 97 may be spaced a radial distance from the center of the swivel head 60 for cooperation with a pin 98 on an indexing bracket 99 fixed to the cross-carriage swivel support 60a. The pin 97 on the swivel head 60 and the pin 98 on the bracket 99 would be aligned with a suitable imaginary base-line 100 extending crosswise of the way shafts 62 on the main carriage 63, or parallel to the longitudinal ways 65 of the machine (see Fig. 9a). The hand wheel 77 would be rotated to shift the carriage 61 rectilinearly along the cross ways 62, 62 a distance $y$ equal to the radius of the head pin 97 from the center of the swivel times the sine of the desired angle $r$ of adjustment (see Fig. 9b), the swivel 60 then being rotated so as to position its pin 97 back in alignment with the base-line 100 (see Fig. 9c), after which the hand feed 77 of the carriage would be reversely rotated to bring the index pin 98 to its initial position in alignment with the base-line 100 (see Fig. 9d). Of course, the swivel head 60 would be clamped in this position of adjustment so as to maintain the boring angle of the spindle 50 with respect to the rotary table 11.

It is to be noted that accurate indications on the counter 78, micrometer dial 80, and vernier 81 are obtainable in adjusting the cross-carriage 61 and swivel head 60 to the same degree as is obtainable in angularly adjusting the rotary table 11. In angularly adjusting both parts, if the counter and micrometer dials are initially set at zero, they may be first shifted the desired linear distance as shown on these indicating devices, and then returned to their initial positions, which can be exactly determined since the indicators would again read zero.

The machine described is useful for drilling a plurality of holes accurately in a circle around the work. The spindle 50 would be disposed at right angles to the face of the table and moved outwardly from its center to the desired radius. The first hole would be drilled in the work by moving the spindle towards the table either by means of the compound hand feed 58 or by the power carriage feed screw 66. After this first hole had been drilled, the rotary table 11 would be indexed the desired arcuate extent, preferably by the sine method heretofore described, and the second hole drilled in the work. This cycle of operation is repeated until all of the desired holes have been formed in the work.

Similarly, if a hole is to be bored at an angle in the work, the compound swivel 60 can be rotated the desired arcuate extent, preferably by the above described sine method, and the rotating spindle 50 moved into the work by the compound hand feed 58.

If a tapered hole is to be bored in the work, the compound swivel 60 is adjusted to the taper angle desired, and the tool fastened to the spindle moved up to the work by advancing the main carriage 63 along its ways 65, 65. The table 11 is rotated from a source of power through the belt 37 and pulley 38, and the spindle housing 55 moved along its compound slide 57 by the hand feed 58 of the compound to bore or cut the desired tapered hole in the work. It is to be understood that when a tapered boring operation is being performed, the center of the rotary table head is at the same level as the boring spindle, and that the worm 40 has been disengaged from the worm gear 39 to enable rotation of the table by power means.

Various other operations are performable with the machine described. For example, layout work and inspection can be done rapidly and accurately. In inspecting holes arcuately disposed in a circle, whether or not the angular displacement falls within a plus or minus permissible error is determinable by using the same sine method heretofore described in connection with the pin 94 and the pin or pins 90 on the table 11. The bracket pins 93 and 95 are disposed on opposite sides of the intermediate pin 94, and may be used as oppositely directed reference faces for the purpose of laying out and/or checking the lines or points of a work piece, in the manner particularly pointed out in United States Patent No. 2,178,264.

While I have shown the preferred form of my invention, it is to be understood that various changes may be made in its construction by those skilled in the art without departing from the spirit of the invention, as defined in the appended claims.

Having thus described my invention, what I claim and desire to secure by Letters Patent is:

1. In a machine tool the combination of a frame, a first support guided on said frame for movement in a rectilinear path, a second support carried by said first support for bodily rectilinear movement therewith and pivoted thereon for angular movement about an axis which is in fixed relation to the first support and vertical to said rectilinear path thereof, a first member fixed with said first support and having a gauging surface adjacent the periphery of the second support and in predetermined fixed relation to a reference line vertical both to said axis and to said rectilinear path and passing through said axis, a second member carried by said second support and having a gauging surface adjacent the periphery thereof and coinciding with a portion of the surface of a cylinder which is axially parallel with the axis of said second support, said second member being adjustable relative to said first support to effect a predetermined position of the gauging surface thereof relative to said reference line, means for effecting a predetermined rectilinear movement of said first and second supports while maintaining said second support in an angular position maintaining said second member gauging surface and in said predetermined position relative to the reference line, and means for angular adjustment of said second support to return said second member gauging surface to the same position in said rectilinear path which it occupied previous to said predetermined rectilinear movement of the first support and while maintaining said first and second supports in the position of said predetermined rectilinear movement; whereby to effect a predetermined angular movement of said second support relative to said reference line.

2. In a machine tool the combination of a frame, a first support guided on said frame for movement in a rectilinear path, a second support carried by said first support for bodily rectilinear movement therewith and pivoted thereon for angular movement about an axis which is in fixed relation to the first support and vertical to said rectilinear path thereof, a first member fixed with said first support and having a gauging surface adjacent the periphery of the second support and in predetermined fixed relation to a reference line vertical both to said axis and to said rectilinear path and passing through said axis, a second member carried by said second support and having a gauging surface adjacent the periphery thereof and coinciding with a portion of the surface of a cylinder which is axially parallel with the axis of said second support, said second member being adjustable relative to said first support to effect a predetermined position of the gauging surface thereof relative to said reference line, means for effecting a predetermined rectilinear movement of said first support while maintaining said second support in an angular position maintaining said second member gauging surface in said predetermined position relative to the reference line, means for angular adjustment of said second support to return said second member gauging surface to the same position in said rectilinear path which it occupied previous to said predetermined rectilinear movement and while maintaining said first support in the position of said predetermined rectilinear movement thereof, and means for reverse rectilinear movement of said first support to return said first member gauging surface to the same position in said rectilinear path which it occupied previous to said predetermined rectilinear movement and while maintaining said second support in the position of said angular adjustment thereof.

3. In a machine tool the combination of a frame, a first support guided on said frame for movement in a rectilinear path, a second support carried by said first support for bodily rectilinear movement therewith and pivoted thereon for angular movement about an axis which is in fixed relation to the first support and vertical to said rectilinear path thereof, a first member fixed with said first support and having a gauging surface adjacent the periphery of the second support and in predetermined fixed relation to a reference line vertical both to said axis and to said rectilinear path and passing through said axis, a second member carried by said second support and having a gauging surface adjacent the periphery thereof and coinciding with a portion of the surface of a cylinder which is axially parallel with the axis of said second support, said second member being adjustable relative to said first support to effect a predetermined position of the gauging surface thereof relative to said reference line, means for effecting a predetermined rectilinear movement of said first and second supports while maintaining said second member gauging surface in said predetermined position relative to the reference line, means for angular adjustment of said second support to return said second member gauging surface to the same position in said rectilinear path which it occupied previous to said predetermined rectilinear movement and while maintaining said first and second supports in the position of said predetermined rectilinear movement, means for reverse rectilinear movement of said first and second supports to return said first member gauging portion to the same position in said rectilinear path which it occupied previous to said predetermined rectilinear movement thereof and while maintaining said second support in the position of said angular adjustment thereof, a rotatable tool spindle axially parallel with the axis of said second support, and a spindle support carried by said frame and positioning said spindle axis in a common plane with said second support axis when said first support is in the position occupied following said reverse rectilinear movement thereof, said third support being guided on said frame for rectilinear movement in a path maintaining the spindle axis in said common plane and vertical to the rectilinear path of movement of said first support.

4. In a machine tool having a frame, the combination of a rotatable tool spindle, a spindle first support guided on said frame for movement in a rectilinear path, a spindle second support carried on said first support for movement therewith and angularly adjustable thereon about an axis vertical to said rectilinear path, a spindle carrier rotatably supporting said spindle and carried on said second support and guided thereon for rectilinear movement in various paths as determined by the angular adjustment thereof, a first member fixed with said first support and having a gauging surface adjacent the periphery of said second support and in fixed relation to a reference line vertical both to the axis thereof and to said rectilinear path and passing through said axis, a second member carried by said second support and having a gauging surface adjacent the periphery thereof and coinciding with a portion of the surface of a cylinder which is axially parallel with the axis of said second support, said second member being adjustable relative to said first support to effect a predetermined position of the gauging surface thereof relative to said reference line, means for effecting a predetermined rectilinear movement of said first and second supports while maintaining said second support in an angular position maintaining said second member gauging surface in said predetermined position relative to the reference line, and means for angular adjustment of said second support to return said second member gauging surface to the same position in said rectilinear path which it occupied previous to said predetermined rectilinear movement of the first support and while maintaining said first and second supports in the position of said predetermined rectilinear movement; whereby to effect a predetermined angular movement of said second support relative to said reference line.

WALLACE J. S. JOHNSON.